United States Patent [19]

Taylor

[11] Patent Number: 5,716,045
[45] Date of Patent: Feb. 10, 1998

[54] UNIVERSAL PRECISION POSITIONING JIG WITH MICRO POSITIONING CAPABILITY

[75] Inventor: Christopher L. Taylor, Dallas, Tex.

[73] Assignee: Taylor Design Group, Inc., Dallas, Tex.

[21] Appl. No.: 508,040

[22] Filed: Jul. 27, 1995

[51] Int. Cl.⁶ .................................................. B23Q 3/02
[52] U.S. Cl. ........................................................ 269/303
[58] Field of Search ................................. 269/36, 56, 60,
269/65, 68, 74, 77, 81, 236, 303, 307, 315,
904, 905, 229; 144/253.1, 253.2, 253.5;
33/452, 483, 489, 491, 813, 814, 818, 828,
830, 626, 573; 83/467.1, 468, 468.2, 468.7

[56] References Cited

U.S. PATENT DOCUMENTS

| | | |
|---|---|---|
| 503,726 | 8/1893 | Pryibil . |
| 977,474 | 12/1910 | Read et al. ............................ 269/315 |
| 996,884 | 7/1911 | Richards ............................... 269/236 |
| 1,947,885 | 6/1934 | Tautz . |
| 2,342,700 | 2/1944 | Schnitzer ............................. 144/253.1 |
| 2,409,921 | 11/1946 | Wulff . |
| 2,852,049 | 9/1958 | Peterson .............................. 269/307 |
| 2,862,410 | 12/1958 | Meyer .................................. 269/60 |
| 2,997,317 | 8/1961 | Scott . |
| 3,379,229 | 4/1968 | Siegal .................................. 269/303 |
| 3,484,830 | 12/1969 | Wagner . |
| 3,865,095 | 2/1975 | Helmick . |
| 4,013,280 | 3/1977 | Chitayat et al. ...................... 269/60 |

(List continued on next page.)

FOREIGN PATENT DOCUMENTS 776207 6/1957 United Kingdom .

OTHER PUBLICATIONS

Incra®Fence System/Incra®Right Angle Fixture Owner's Manual, published 1990 by Taylor Design Group, Inc.
Incra®Jig Pro Owner's Manual, published 1992 by Taylor Design Group, Inc.
Incra®Ultra Owner's Manual published Sep., 1994 by Taylor Design Group, Inc.
Incra® Miter Slider Owner's Manual, published 1991 by Taylor Design Group, Inc.
Incra® Jig Owner's Manual, published 1988 by Taylor Design Group, Inc.
Micro Positioner booklet, pp. 4–7.
Woodwork, Nov./Dec. 1992, No. 18.

Primary Examiner—Robert C. Watson
Attorney, Agent, or Firm—Workman, Nydegger & Seeley

[57] ABSTRACT

Disclosed herein is a universal precision positioning jig for woodworking and other operations that is of lightweight and efficient design and that has micro positioning capability. The disclosed positioning comprises a carriage riding on elongated planar bearing plates on a fixed base. Two bearing plates are located at 45° angles on one side of the base and are used in conjunction with a positioning mechanism located on an opposite side of the base for clamping the carriage to the base. The carriage is of lightweight, double hollow construction. The positioning mechanism utilizes complementary toothed racks for fixing the carriage to the base. A hinged swing rack mounted to the base engages a toothed rack on the swing rack with a toothed rack on the base, and is clamped into the engaged position using primary and secondary clamping levers. The secondary clamping lever is used to sustain general positioning of the carriage while allowing micro positioning. Micro positioning is accomplished with a micro position adjustment knob that controls the longitudinal position of the swing rack and the carriage when engaged with the swing rack. The primary clamping lever is used to securely clamp the carriage to the bearing plates on the base for cutting operations once micro positioning is accomplished. A novel rotating scale is used to meter the micro positioning, and multiple templates on the carriage with formulas for intricate cuts are used for general positioning.

51 Claims, 6 Drawing Sheets

U.S. PATENT DOCUMENTS

| | | |
|---|---|---|
| 4,028,988 | 6/1977 | Schäfers . |
| 4,206,910 | 6/1980 | Biesemeyer ............................ 269/315 |
| 4,793,604 | 12/1988 | Taylor . |
| 4,930,221 | 6/1990 | Taylor . |
| 4,965,943 | 10/1990 | Adams . |
| 5,018,562 | 5/1991 | Adams . |
| 5,063,983 | 11/1991 | Barry . |
| 5,097,601 | 3/1992 | Pollak et al. . |
| 5,109,742 | 5/1992 | Strong . |
| 5,195,730 | 3/1993 | Taylor . |
| 5,215,296 | 6/1993 | Adams . |
| 5,275,074 | 1/1994 | Taylor . |
| 5,353,515 | 10/1994 | Alvis et al. . |
| 5,423,360 | 6/1995 | Taylor et al. . |

UNIVERSAL PRECISION POSITIONING JIG WITH MICRO POSITIONING CAPABILITY

BACKGROUND OF THE INVENTION

1. The Field of the Invention

The present invention relates to positioning jigs used for precisely orienting and maintaining workpieces in a predetermined position relative to a cutting tool or other reference point. More particularly, the present invention is directed to a lightweight precision positioning jig that has micro positioning capability and that is capable of handling large workpieces while occupying minimal surface area.

2. The Relevant Technology

In the past, woodworkers used hand tools to reduce wood workpieces into desirable and useful objects. The advent of power tools and other recent advances have made woodworking quicker and easier, but many of the techniques used today are virtually the same as they were centuries ago. One critical technique that is still evolving rapidly is the positioning process by which the woodworker determines the location of cutting operations to be made on the workpiece. Until recently, the positioning process was almost entirely manual. Accurate placement of each cut was dependent exclusively upon the woodworker's experience and skill. Positioning processes have been improved recently, largely due to the incorporation of mechanisms into power cutting tools that can be mechanically adjusted to position the workpiece in the desired position relative to the cutting tool.

One such mechanism commonly used to position a workpiece relative to a power tool, such as a table saw or router, is the fence. Typically, the operator feeds the workpiece by hand through the cutting tool by sliding one edge of a workpiece along the fence. The fence is adjusted prior to each cutting operation to be a predetermined distance from the cutting tool, according to the desired location of the cut. One manner of mechanically positioning the fence involves the use of a lead screw and a rotating knob. The rotating knob turns the lead screw which augers and adjusts the position of the fence. A scale can be used to determine the location of the fence with respect to the curing tool, or the lead screw can be separately calibrated to set the location of the fence by how far the rotating knob is turned. This form of positioning is often referred to as vernier adjustment.

A shortcoming of existing mechanical positioning devices such as those just described is that they are typically made of heavy steel and are permanently mounted to the woodworking equipment table. Thus, they are quite cumbersome, requiring a large amount of shop space to accommodate their bulk. They are also quite expensive. Smaller, less expensive devices have been developed, but the speed and accuracy of these devices has proven limited. The accuracy of the positioning mechanism is critical, as the quality of the work product created with them is ultimately dependent upon the precision with which the positioning mechanisms can be set. An improperly placed cut can instantly reduce the workpiece from being a potentially treasured article to occupying the trash heap.

There is a recent trend in woodworking toward improving the accuracy and rapidity of workpiece positioning operations and improving the repeatability of positioning techniques. Thus, there has been a continued emphasis on improving existing equipment and procedures to facilitate greater precision, repeatability, and rapidity. This trend has also led to simpler, smaller, and less expensive devices that allow professionals and amateurs alike to more quickly complete highly intricate and challenging projects.

3. Prior State of the Art

A number of positioning jigs have recently been designed in order to improve the positioning process. For instance, U.S. Pat. No. 4,793,604 granted to Christopher L. Taylor (hereinafter referred to as "the Taylor '604 patent) discloses a universal precision positioning jig adapted for precision positioning of a workpiece with respect to a woodworking tool, such as a table saw, router, or the like. The Taylor '604 patent includes a fixed lower body member and a moveable upper body member, each having mounted thereon a series of tooth-like projections formed into elongated racks. The upper body member is provided with a mount for a fence and is moveable with respect to the fixed lower body member. The racks are meshed together by the tightening of a knob threaded through the middle of the upper and lower body members. The knob is tightened after the fence has been properly positioned to prohibit movement of the upper and lower body members relative to each other during the cutting operation. This, in turn, fixes the position of the fence.

The toothed rack meshing system was further improved upon in U.S. Pat. No. 5,195,730 (hereinafter referred to as "the Taylor '730 patent"), also granted to Christopher L. Taylor. The Taylor '730 patent discloses a fixed base and a carriage, moveable with respect to the base. Toothed racks such as those taught in the Taylor '604 patent are also used. One toothed rack is mounted on the carriage and a complementary toothed rack is mounted on the base. The carriage rides on slots in the base and is spring loaded to prevent meshing of the toothed racks until positioning is completed. A cammed clamping lever attached to a rod running through the carriage and base clamps the carriage and the base together, thereby locking and intermeshing the toothed racks to set the carriage position.

One improvement in the art resulting from the Taylor '604 and '730 patents is the use of calibrated templates slidably mounted in slots on the carriage. A cursor above the templates measures the position of the carriage with respect to the cutting blade. Formulas are printed on the templates in order to produce complicated cuts such as dovetail joints or box joints. Using these templates, woodworkers can quickly create intricate wood products previously attainable only by experienced professionals.

The intermeshing teeth on the toothed racks of the Taylor '604 and '730 patents are set at intervals of 1/32 of an inch, and provide fully repeatable positioning with a precision of 1/32 of an inch. The accuracy and rapidity of positioning of the Taylor patents constitutes a substantial improvement in the art. Nevertheless, the Taylor patents are limited in the fineness of positioning of which they are capable to increments of 1/32 of an inch.

U.S. Pat. No. 5,215,296 issued to Phillip A. Adams also discloses a positioning jig using a base and a moveable carriage mounted thereon. The carriage rides on tubular rails mounted to the base, and movement of the carriage with respect to the base is facilitated by two sets of rollers mounted to the carriage and contacting the top and bottom of the tubular rails. A lead screw extends through the base, and a threaded half nut mounted by a bracket to the carriage engages with the threads of the lead screw. The half nut bracket is spring loaded and is connected to a two-position indexing button extending from the base. When the indexing button is in the default position, the half nut engages the lead screw and fixes the carriage to the base. When the two position button is depressed, the half nut disengages, and the base is free to move.

The lead screw of the Adams jig is threaded at a pitch of 32 threads per inch. Consequently, the two position indexing button has an accuracy for general positioning of 1/32 of an inch. Additionally, the lead screw is also rotatable to provide positioning in increments finer than 1/32 of an inch for positioning that is related to vernier adjustment and will hereinafter be referred to as "micro positioning." A clamping knob located on a bracket extending over the carriage is used to clamp the carriage to the base after micro positioning.

The capability for micro positioning is a desirable feature. The use of a threaded screw provides the capability for almost infinite increments of adjustment. Placing the lead screw on the base limits the Adams patent, however. The fact that the half nut bracket must extend from the carriage to the lead screw mounted on the base requires that the base be at least as long as the carriage. Because of this, the range of distance over which cuts can be made with the jig is limited to the amount of table space available.

Other problems are also inherent in the Adams patent. For instance, the exactness with which the carriage is fastened to the base will be dependent upon close manufacturing tolerances and a low state of wear of the device. The design is also dependent upon moving parts, such as rollers and bearings, the integrity of which could also present a problem over extended periods of use in the woodworking environment.

Accordingly, there remains a need in the woodworking industry for an improved positioning jig having the properties of durability, precision, repeatability, and rapidity that are required by modern day woodworkers. From the foregoing discussion, it appears that it would be beneficial to the woodworking industry to provide an efficient and accurate design such as that of the toothed rack system of the Taylor devices that is also capable of micro positioning. It would also be a great improvement in the art if such a device could be made light, yet strong and torsionally rigid, and able to provide a broad positioning range while using a minimum of table space. Such a device would be even more advantageous if it were relatively easy to use and inexpensive.

SUMMARY AND OBJECTS OF THE INVENTION

The present invention seeks to resolve the above and other problems that have been experienced in the art. More particularly, the present invention constitutes an advancement in the art by providing a universal precision positioning jig with micro positioning capability that achieves each of the objects listed below.

It is an object of the present invention to provide a positioning jig that is lightweight and inexpensive and yet provides high mechanical strength and great torsional rigidity when locked into position.

It is likewise an object of the present invention to provide such a positioning jig that utilizes an efficient toothed rack positioning system.

It is further an object of the present invention to provide such a positioning jig that is capable of accurate, finite positioning in increments finer than 1/32 of an inch.

It is further an object of the present invention to provide such a positioning jig having positioning and locking mechanisms located to one side of the base, such that the base portion can be minimized in size, resulting in a carriage that can be many times longer than the base for operations on large workpieces in environments with limited table space.

It is further an object of the present invention to provide such a positioning jig that provides a lightweight carriage capable of smooth movement relative to a fixed base over long periods of use without the need for roller bearings.

It is also an object of the present invention to provide such a positioning jig that is easily calibrated and zeroed using a highly accurate positioning scale.

It is further an object of the present invention to provide such a positioning jig that utilizes programmed templates for reducing complex series of cuts down to simple formulas, and that has the capability of situating multiple templates on the positioning jig at one time.

To achieve the foregoing objects, and in accordance with the invention as embodied and described herein, the present invention comprises a universal precision positioning jig having a side-mounted toothed rack positioning system and micro positioning capability. The universal precision positioning jig of the present invention comprises a fixed base, configured with a bottom and two sides that create a cradle within which a carriage is glidably engaged. The carriage is of lightweight construction, is elongated, and has a fence located at one end for positioning the workpiece relative to a given reference point. The carriage moves freely in a longitudinal direction through the cradle in the base and can be clamped to the base in predetermined increments with the use of positioning and clamping mechanisms.

The carriage is adapted to glide on bearing surfaces covered with wax-impregnated polyethylene bearing plates. The bearing surfaces are located on the base at the points of contact with the carriage and are fixed at oblique angles to the surface of the carriage. Two of the bearing surfaces are mounted on one side of the carriage to provide a backstop against which the carriage can be clamped.

The positioning mechanism is housed within a side fixture located at one side of the base. The side fixture has formed therein a C-shaped hinge groove into which is rotatably mounted a rounded hinge core of a swing rack. The swing rack is spring-loaded and extends downward from the hinge. In the bottom edge of the swing rack is located a toothed rack. A corresponding toothed rack extends along the length of the side of the carriage, adjacent to the swing rack-mounted toothed rack. The swing rack has two functional positions. In the first position the toothed racks are disengaged and the carriage is free to move. In the second position the toothed racks are engaged and the position of the carriage is fixed.

A primary clamping lever and a secondary clamping lever are also mounted on the side fixture and are provided with cams through which the swing rack may be rotated and clamped against the carriage in a position wherein the swing rack-mounted toothed rack engages the carriage-mounted toothed rack. The secondary clamping lever is engaged after the carriage has been initially positioned and before micro positioning. The secondary clamping lever engages the swing rack with a sufficiently strong force to maintain engagement of the toothed racks but a sufficiently weak force to allow the swing rack to move in a linear direction within the hinge groove.

Multiple slots are located in the top of the carriage to receive gradiated templates. The templates are read with the use of a hairline cursor designated on a transparent overlay plate above the carriage, and are used to position the carriage in the desired location for general positioning. General positioning provides an accuracy of 1/32 of an inch, resulting from the 1/32 spaced increments of the toothed racks. Micro positioning is much more precise, providing positioning in increments of about 1/1000 of an inch.

Micro positioning is accomplished by means of a micro position adjustment knob out of which extends a threaded positioning screw. The threaded positioning screw engages a first end of the hinge core. A second end of the hinge core presses against a compression spring. When the micro position adjustment knob is rotated, the positioning screw rotates within a fixed nut in the side fixture, moving the positioning screw linearly either toward or away from the cutting blade reference point. The hinge core, due to the back pressure from the compression spring, is in turn caused to move in the direction of movement of the positioning screw. Thus, by moving the micro position adjustment knob a predetermined position, the swing rack is moved the same distance. This in turn moves the carriage, mounted to the swing rack by virtue of the engaged toothed racks, a corresponding distance.

Micro positioning is monitored with a transparent overlay plate located above the micro position adjustment knob. The overlay plate is provided with a range scale marked with gradients of 1/32 of an inch and is read by observing the position of the edge of the micro position adjustment knob under the overlay plate. The micro position adjustment knob also has an independently rotating scale fastened around its circumference and designated with gradients of about 1/1000 of an inch. The rotating scale is read with the use of a hairline cursor marked on the overlay plate.

Once micro positioning is completed, the primary clamping lever is engaged. The primary clamping lever automatically disengages the secondary clamping lever and presses the swing rack against the carriage with sufficient force to securely clamp the carriage against the angled bearing surfaces in the far side of the base.

The fence can also be provided with a second positioning mechanism for controlling the length of the cut. A corresponding template can be used with the length of cut positioning mechanism.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
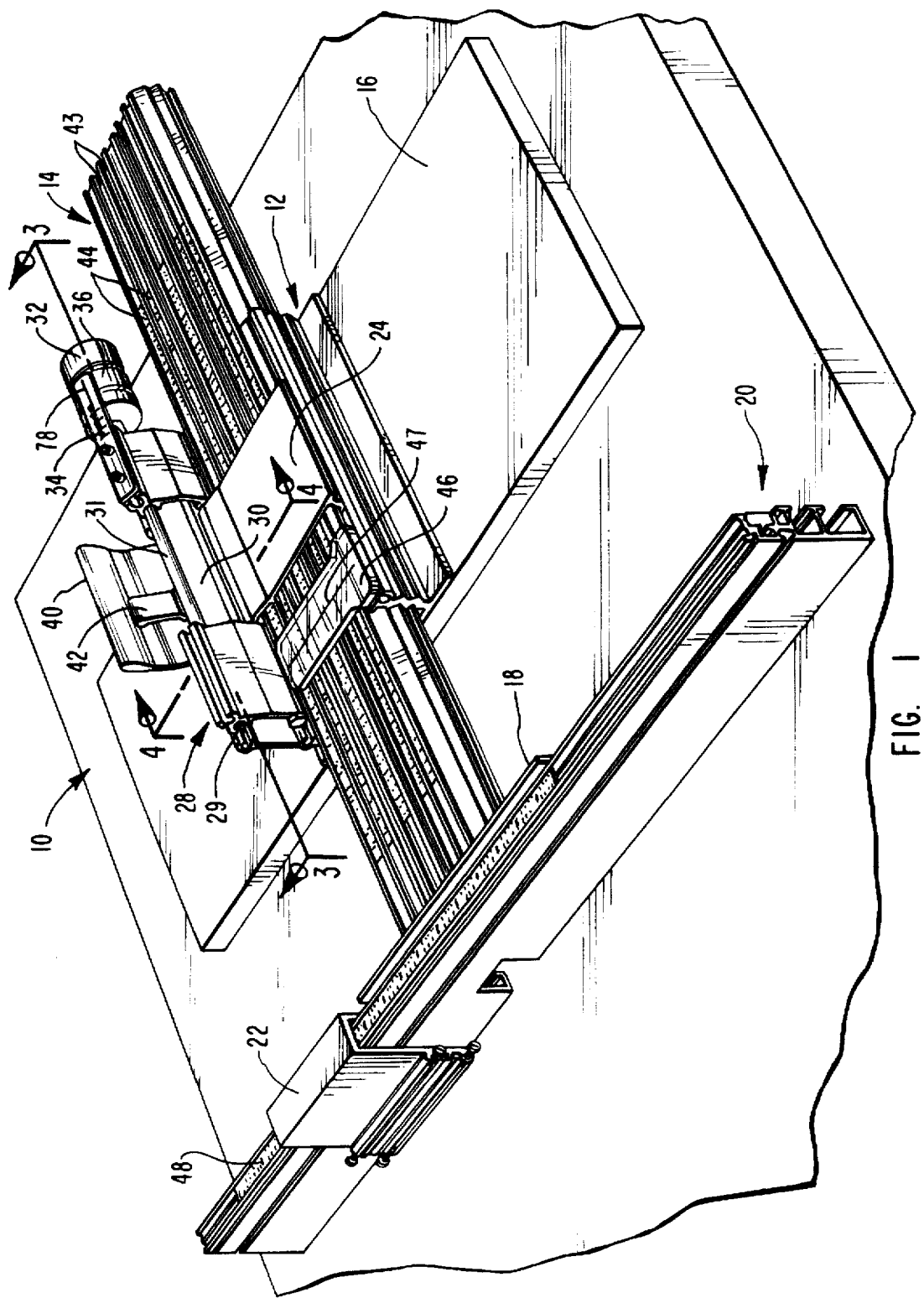
FIG. 1 is a perspective view of the positioning jig of the present invention.

The present invention comprises a universal precision positioning jig utilizing toothed racks and having a side mounted positioning mechanism and micro positioning capability. Shown in FIG. 1 are the basic components of a positioning jig 10 of the present invention. Positioning jig 10 includes a base 12 on which rests, in slidable engagement thereon, a carriage 14. Carriage 14 is provided at one end with a fence mounting bracket 18, to which is mounted a fence 20. Fence 20 is optionally provided with a length of cut positioning mechanism 22. Located to one side of base 12 is a side fixture 28. Side fixture 28 houses the mechanisms that perform the operations of positioning carriage 14 and clamping carriage 14 to base 12. Side fixture 28 is shown in greater detail in FIGS. 2 and 3.

Figure 4:
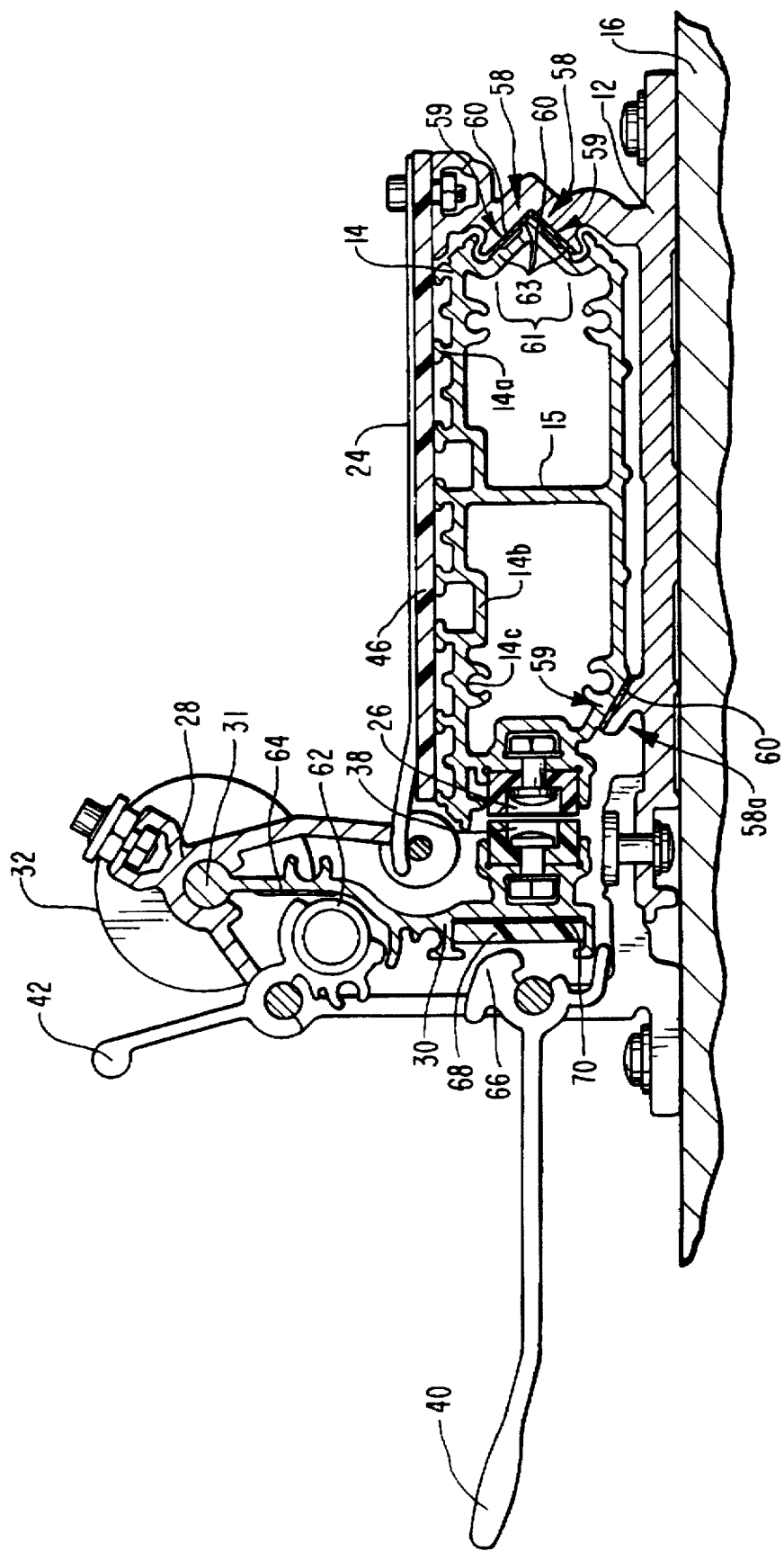
FIG. 4 is a cross-sectional view of the present invention taken at line 4—4 of FIG. 1, showing the carriage disengaged from the base.

Each of the basic components will now be discussed in turn. As best shown in FIG. 4, carriage 14 is constructed as an elongated member having an aluminum outer shell divided by an inner wall 15. Inner wall 15 forms two hollows extending the length of carriage 14. The outer shell carriage 14 incorporates functional structures in the form of raised ribs 14A which form template slots 43, T-slots 14B, and fence mounting screw bosses 14C. The double hollow construction gives carriage 14 ninety percent of the strength of a solid block of aluminum, though carriage 14 comprises only a fraction of the weight and cost of solid aluminum. Due to the light weight of carriage 14, smooth movement of carriage 14 relative to base 12 is easily enabled without the need for expensive and perishable roller bearings. Furthermore, carriage 14 can be quite long without putting a heavy load on base 12.

The forward end of carriage 14 is provided with means for orienting the workpiece relative to carriage 14. In the presently preferred embodiment, this comprises fence mounting bar 18 to which is attached fence 20. Fence 20 provides a surface against which the workpiece is braced in making the intended cuts or operations on the workpiece. Fence 20 is initially zeroed exactly to the forward edge of the cutting tool or any other desired reference point, and this position is thereafter used as a reference point for cutting operations on the workpiece. The location of the cuts thereafter are determined by the relative position of fence 20, which is precisely settable as will be described hereafter.

Base 12 is preferably attached to mounting piece 16, which is in turn clamped or otherwise mounted to the table surface on which is mounted the blade of the woodworking or other forming equipment. This provides a means for fixing the position of the base with respect to a given reference point.

Base 12 is configured with a bottom and two sides. The two sides extend upward to cradle carriage 14. A top plate 24 is attached to the top edges of the two sides of base 12, partially enclosing carriage 14. Thus, carriage 14 is allowed to glide in the cradle formed by base 12 in a single, linear direction that will hereinafter be referred to as the "longitudinal direction."

Planar surface means for providing low friction support and guidance between carriage 14 and base 12 are provided as part of the present invention in the form of bearing plates 60. Bearing plates 60 are situated atop flat bearing surfaces 58 and 58A of base 12, which are located at several points of contact 59 between carriage 14 and base 12. Bearing plates 60 are preferably flat, elongated strips covering substantially all of bearing surfaces 58 and 58A. Bearing plates 60 are preferably constructed of wax-impregnated polyethylene, known in the trade as UHMW, though it will be apparent to one skilled in the art that other low friction materials could also be used. Bearing plates 60 are extremely durable and provide a smooth, low friction movement of carriage 14 that will not significantly deteriorate over time. Points of contact 59 may be provided with raised ribs 63 that ride on bearing plates 60 for reducing the surface area in contact between carriage 14 and base 12. This helps to reduce friction, and channels sawdust away from sliding surfaces in contact between carriage 14 and base 12.

Bearing surfaces 58 also perform a second function. FIG. 4 shows two of bearing surfaces 58 located on the side of the carriage opposite side fixture 28, which will hereinafter be referred to as "the distal side." All of bearing surfaces 58 and 58A are preferably set at an oblique angle to the surface on which carriage 14 is to be mounted. This angle is most preferably set at about 45 degrees for bearing surfaces 58, and at about 30 degrees for bearing surface 58A. The two bearing surfaces 58 on the distal side of carriage 14 are preferably adjacently located and form a 90 degree angle notch 61, which functions as a self aligning brace against which carriage 14 can be clamped. In the preferred embodiment, an additional bearing surface 58A is also set at an oblique angle and is located on the side of base 12 that is adjacent to side fixture 28, hereinafter referred to as the "proximal side," so that carriage 14 rides evenly and smoothly. The inventive bearing surfaces and the clamping structure of the present invention will not be significantly compromised by wear, such that the accuracy of positioning jig 10 will remain essentially unaltered despite extensive use.

Figure 2:
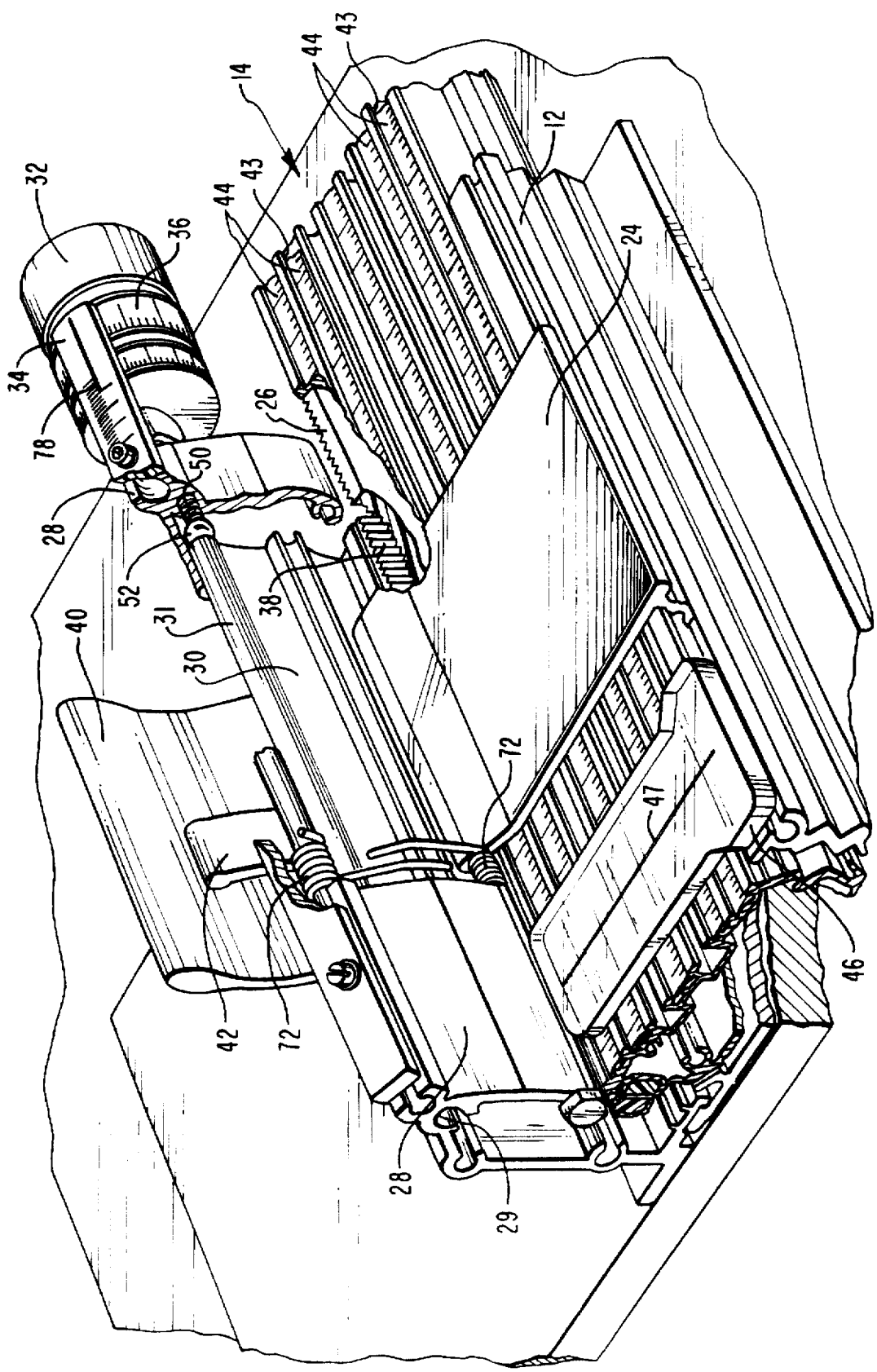
FIG. 2 is a closeup perspective view of a portion of the present invention showing in detail the positioning mechanism, including a cutaway section showing the swing rack and the toothed racks.

Housed in side fixture 28 is one means for coupling the carriage to the base in predetermined, incremental units. Shown in FIGS. 1 and 2 is a semicircular hinge groove 29 formed in side fixture 28 and into which a rounded hinge core 31 of swing rack 30 is rotatably inserted. Swing rack 30 is integral to the positioning and clamping mechanisms which are mounted in side fixture 28 on the proximal side of base 12. Swing rack 30 is spring loaded and has two functional positions. The first position is the "disengaged position." When in the disengaged position, carriage 14 is free to glide on base 12. The second position is the "engaged position." In the engaged position, carriage 14 is coupled to base 12 and is prevented from moving.

Engagement of swing rack 30 with carriage 14 is effected with toothed rack 26 extending along the length of the side of carriage 14 and toothed rack 38 extending along swing rack 30. Toothed rack 26 engages with toothed rack 38 coupling carriage 14 to base 12 when swing rack 30 is placed in the engaged position. Thus, swing rack 30 provides a means for extending a first interlocking element into interlocking engagement with a second interlocking element, where the first interlocking element is preferably toothed rack 26 and the second interlocking element is preferably toothed rack 38.

As a result of the side-mounted positioning structure and the light weight of carriage 14, carriage 14 and base 12 need not be coextensive in length. Base 12 is preferably relatively short, with a length of around 10 inches. Carriage 14 can be relatively long, and has a length preferably in the range of about 24 to 48 inches. Thus, little table space is occupied by positioning jig 10, yet large workpieces can be used and cuts can be made that are spaced over a wide range of distances.

It should be seen that one skilled in the art could easily design other equivalent methods for extending an element from the base to interlock with an element on the carriage in incremental amounts. For instance, one alternative structure intended to be encompassed within the coupling means of the present invention comprises a partially threaded bracket on the base that can be extended into engagement with a threaded lead screw traversing the length of the carriage for fixing the carriage to the base in increments according to the pitch of the lead screw.

Figure 5:
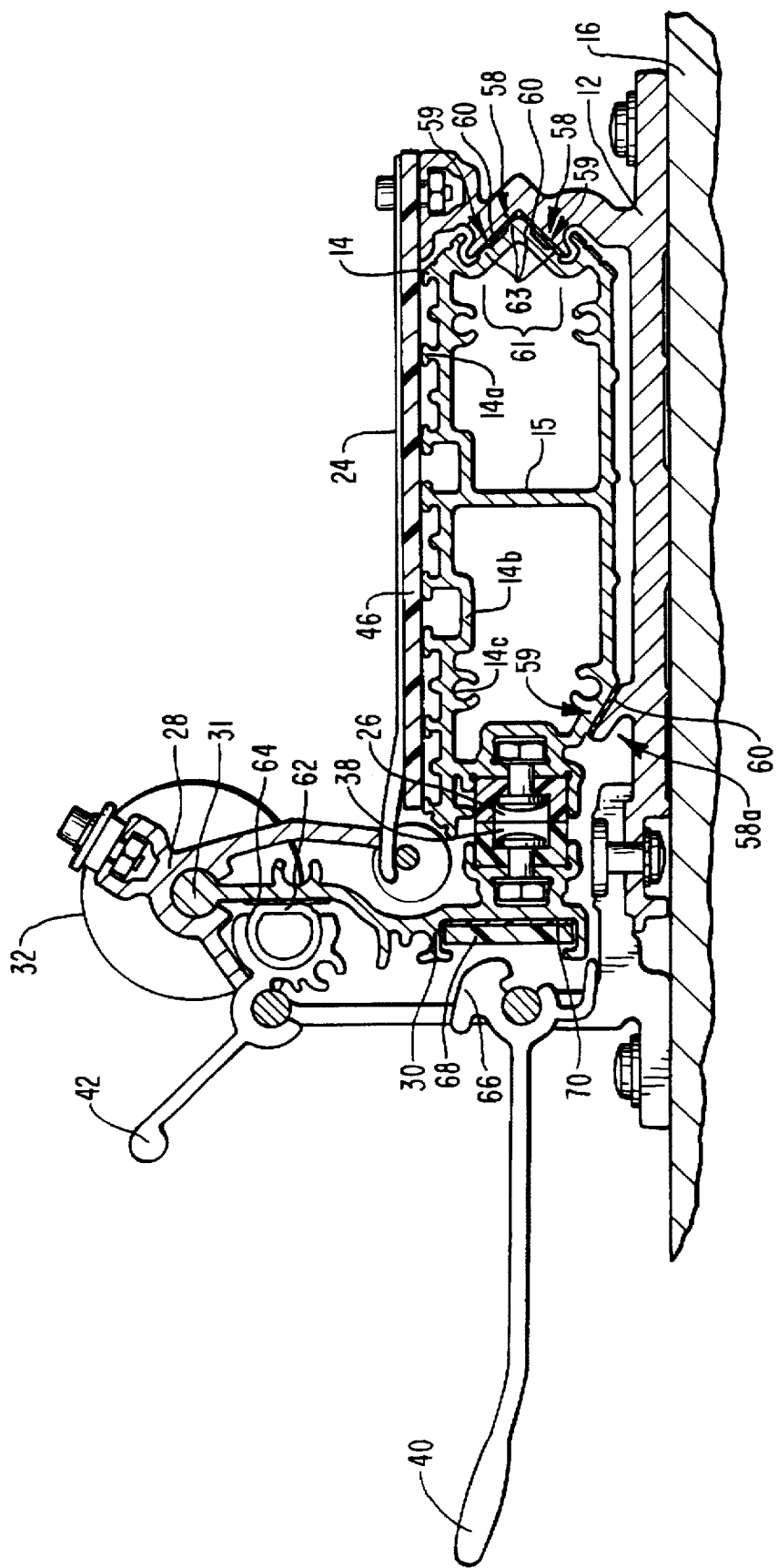
FIG. 5 is a cross-sectional view of the present invention taken at line 4—4 of FIG. 1, showing the secondary positioning lever asserted and the swing rack engaging the toothed racks.
Figure 6:
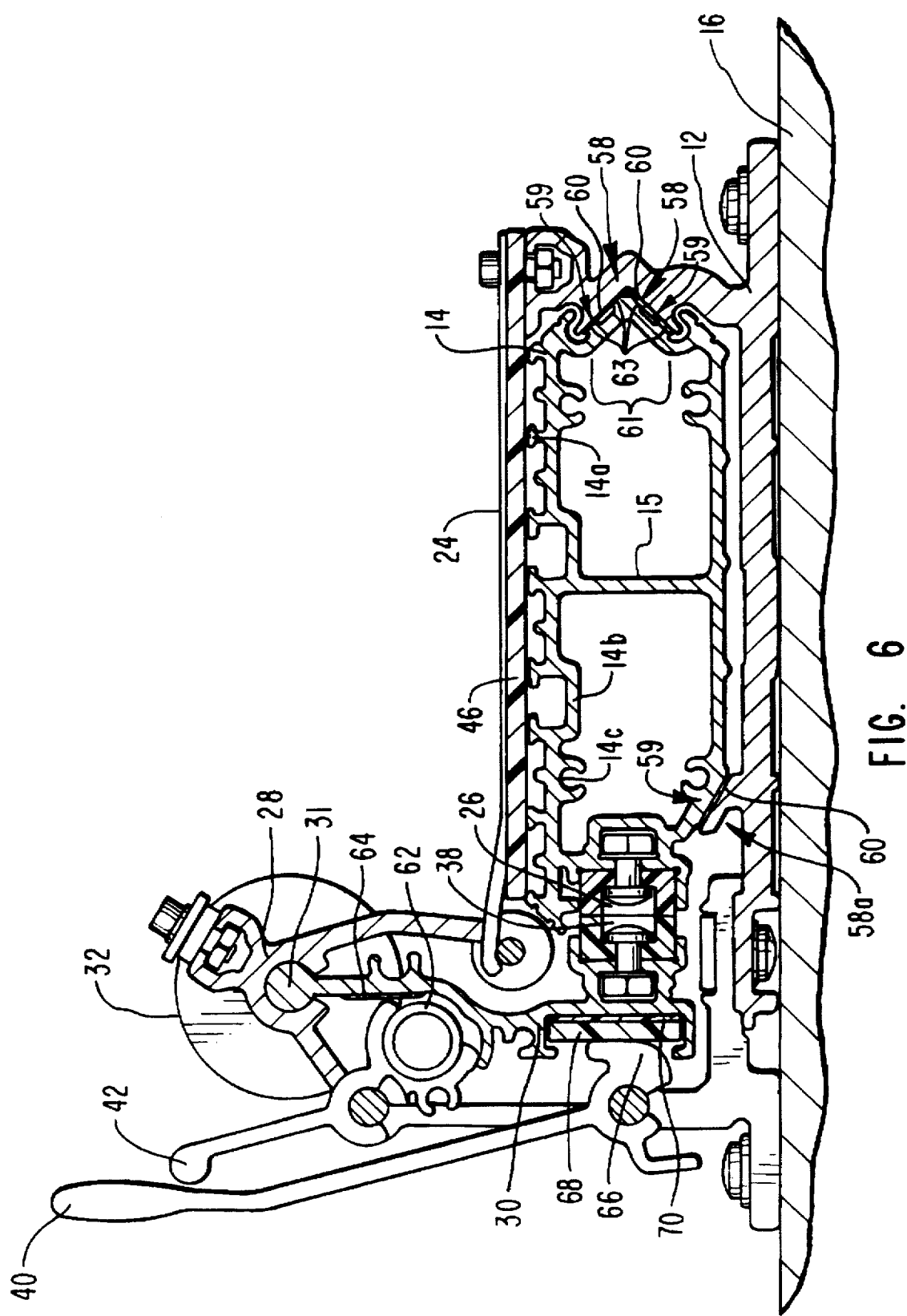
FIG. 6 is a cross-sectional view of the present invention taken at line 4—4 of FIG. 1 of the present invention, showing the primary clamping lever securely clamping the carriage to the base in preparation for the cutting operation.

A means for releasably securing the carriage in a position engaging the base is provided as part of the present invention in the form of a clamping mechanism best shown in FIGS. 4 through 6. The clamping mechanism includes a primary clamping lever 40 and a secondary clamping lever 42. FIG. 4 shows positioning jig 10 with swing rack 30 in the disengaged position, where carriage 14 is allowed to freely glide along bearing surfaces 58 of base 12. In this position, primary clamping lever 40 and secondary clamping lever 42 are unclamped. Torsion springs 72, shown in FIGS. 2 and 3, maintain disengagement of toothed rack 38 from toothed rack 26 and allow free movement of carriage 14 until swing rack 30 is rotated into the engaged position by raising primary clamping lever 40 or lowering secondary clamping lever 42 into the clamped position.

FIG. 6 shows primary clamping lever 40 positioned in an upper or clamping position, clamping swing rack 30 in the engaged position. Secondary clamping lever 42 is shown disengaged. Clamping surface 66 of primary clamping lever 40 is locked against engaging pad 68. Clamping surface 66 is cammed at a point closely adjacent to the pivot point of primary clamping lever 40. Thus, a pressure generated by clamping surface 66 on engaging pad 68 translates to pressure exerted on the distal end of base 12, wherein is located self aligning notch 61 formed by the two obliquely angulated bearing surfaces 58. The pressure generated by clamping surface 16 pushes carriage 14 against self aligning notch 61, thereby creating a back pressure for clamping carriage 14 to base 12. This pressure also securely clamps carriage 14 to base 12. Swing rack 30 can be returned to the free position by pulling primary clamping lever 40 downward to a lower or unclamped position, which is illustrated in FIGS. 4 and 5.

The pressure exerted by clamping surface 66 on large engagement pad 68 can be adjusted by adding or subtracting shims 70 from the back of large engagement pad 68. This feature of the present invention is highly advantageous in that it allows for leeway in tolerances during the production process. Adjustments can be made at the final assembly stage to compensate for small variations by merely adding or subtracting shims 70.

Secondary clamping lever 42 operates in a similar manner to primary clamping lever 40, and is shown in FIG. 5 in the asserted position. In FIG. 5, primary clamping lever 40 is not asserted, and secondary clamping lever 42 has been asserted by rotating it downward to a clamping position. Secondary clamping lever 42 is typically asserted into the clamped position after general positioning, in situations where it is necessary to use the micro positioning mechanism to attain a precision finer than 1/32 of an inch that is provided by general positioning. In FIG. 5, round engagement pad 62 of secondary clamping lever 42 is shown pressed against small engagement pad 64. Round engagement pad 62 is flexible and resilient, and is mounted in a cammed fashion close to the pivot point of secondary clamping lever 42 in order to sustain a pressure against small engagement pad 64.

Due to the position of secondary clamping lever 42 in the swing rack mounting fixture closer to the hinge point of swing rack 30 than that of primary clamping lever 40, the leverage generated by secondary clamping lever 42 is substantially less than that generated by primary clamping lever 40. Furthermore, round engagement pad 62 on secondary clamping lever 42 is made of a low friction material and contacts a small engagement pad 64 on swing rack 62 that is also made of a low friction material. Therefore, once rotated down to the clamped position, secondary clamping lever 42 generates a sufficient amount of pressure to hold swing rack 30 in the engaged position, interlocking toothed rack 38 with toothed rack 26 and thereby fixing carriage 14 to swing rack 30, while still allowing swing rack 30 to move in a linear direction along the axis of hinge core 31 in the longitudinal direction. Thus, swing rack 30 also performs as a means for finitely adjusting the position of an elongated member relative to the base in increments finer than 1/32 of an inch, where the elongated member is the carriage.

Secondary clamping lever 42 is maintained in the clamped position to maintain the general position of carriage 14 until micro positioning is completed in the manner described in detail below. Once micro positioning is completed, primary clamping lever 40 is raised to the clamped position as shown in FIG. 6. Due to the overlapping positions of primary clamping lever 40 and secondary clamping lever 42, primary clamping lever 40 causes secondary clamping lever 42 to be concurrently released to the unclamped position as shown in FIG. 6. More specifically, as primary clamping lever 40 is moved from its lower, unclamped position to its upper, clamping position, an intermediate portion of primary clamping lever 40 contacts the end of secondary clamping lever 42, and forces secondary clamping lever 42 from its lower, clamping position to its upper, unclamped position. With primary clamping lever 40 asserted in the clamped position, base 12 securely locked in position and the cutting operation can be completed.

The micro positioning mechanism is best shown in FIG. 2 and comprises swing rack 30, rotatably mounted within side fixture 28. As previously discussed, swing rack 30 is capable of pivotal movement to engage or disengage the toothed racks. It is also capable of movement in the longitudinal direction along its axis. This movement is effected with positioning screw 50, which has a proximal end abutting one side of hinge core 31. Positioning screw 50 is threaded with 32 threads per inch and is provided at a distal end with micro position adjustment knob 32. Positioning screw 50 is threaded to a fixed nut 74 in side fixture 28. Rotating micro position adjustment knob 32 one full revolution rotates positioning screw 50 one full revolution, which in turn advances or withdraws (depending on the direction of rotation) positioning screw 50 in side fixture 28 a distance of 1/32 of an inch. This moves swing rack 30 and carriage 14, which is attached to swing rack 30 by means of the interlocked toothed racks, a corresponding distance. Thusly, carriage 14 is infinitely positionable by finite movement of micro position adjustment knob 32.

Figure 3:
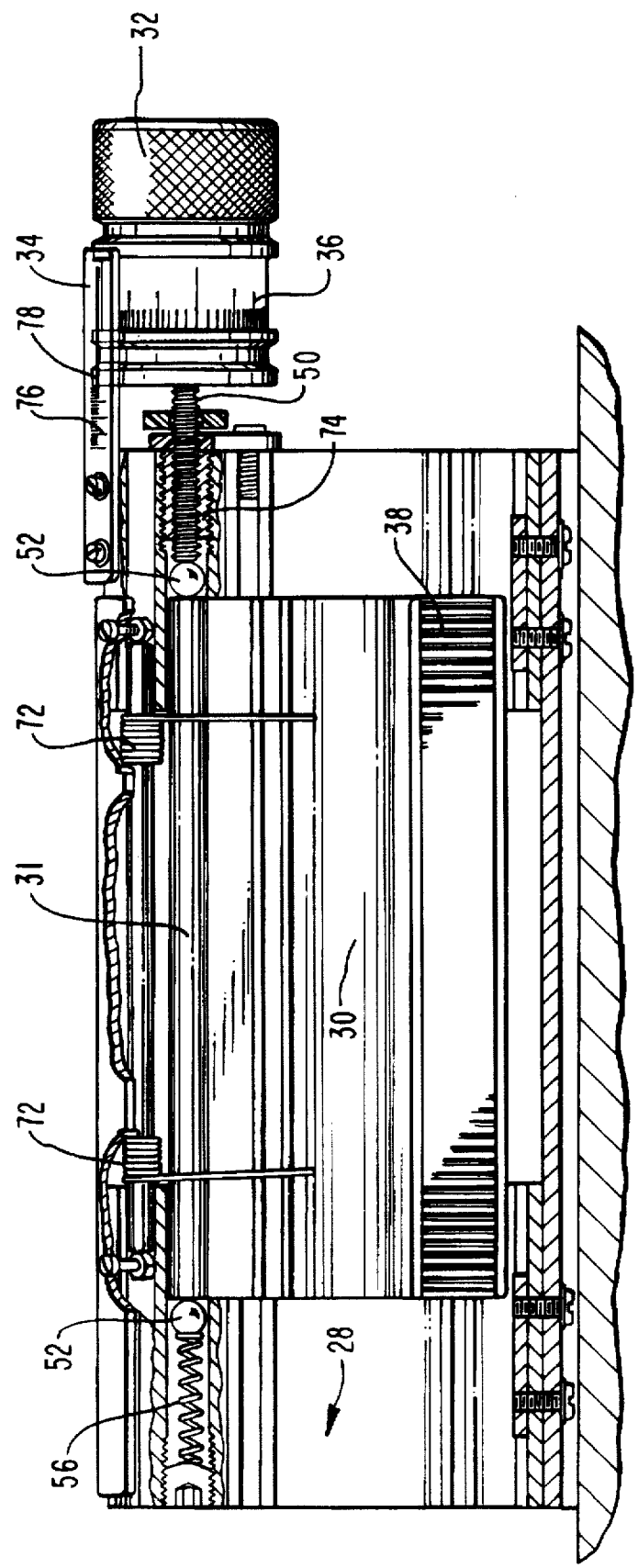
FIG. 3 is a cross-sectional view of the positioning mechanism of the positioning jig of the present invention taken at line 3—3 of FIG. 1, with a cutaway section showing the swing rack and the individual elements of the micro positioning mechanism.

In the preferred embodiment, and as best shown in FIG. 3, the proximal end of positioning screw 50 preferably presses against a ball bearing 52, which in turn presses against hinge core 31 of swing rack 30. The far side of swing rack 30 also preferably presses against a second ball bearing which rests against a compression spring 56. Compression spring 56 provides a bias pressure against positioning screw 50. Thus, rotating micro position adjustment knob 32 in a clockwise direction pushes swing rack 30 toward the cutting blade reference point, and rotating micro position adjustment knob 32 in a counter clockwise position allows the force of compression spring 56 to push swing rack 30 away from the cutting blade reference point. Carriage 14 is thereby moved a corresponding distance.

The method of determining the general position of carriage 14 relative to the given reference point under the present invention is best shown in FIGS. 1 and 2 and comprises five general positioning templates 44. Templates 44 are located in slots 43 at the top of carriage 14. Templates 44 may be scales or they may have designated thereon programs which serve as formulas for making specific cuts. The use of programmed templates is described in U.S. Pat. No. 5,195,730. To read the position of the templates, a transparent overlay plate 46 with a hairline cursor 47 designated on its surface is mounted to one side of base 12, overlaying the top of carriage 14. In the embodiment shown, up to five of templates 44 may be located in slots 43 on carriage 14 at one time, and each of templates 44 may be individually referenced at any time by the single hairline cursor 47 of overlay plate 46. This structure is used for general positioning, and a separate structure is preferably used for micro positioning. An additional template 48 may also be located on fence 20 for use in controlling the length of the cut in conjunction with length of cut positioning mechanism 22.

Means for precisely determining the position of the carriage with respect to the base during micro positioning is also provided as part of the present invention and in one embodiment comprises a second transparent overlay plate 34 having designated thereon a hairline cursor 78 and a range scale 76. Range scale 76 is marked with increments of 1/32 of an inch and reads against the forward edge of micro position adjustment knob 32, as can be seen in FIG. 3. Hairline cursor 78 reads on a rotating scale 36 which is frictionally held in place around micro position adjustment knob 32, and can also be independently rotated around the circumference of micro position adjustment knob 32. Such independent rotation is used for setting different micro position reference points. Rotating scale 36 has thirty-two equally spaced gradients designated thereon. As discussed above, rotating micro position adjustment knob 32 one full rotation moves the carriage a distance of 1/32 of an inch. The designation of thirty-two equally spaced gradients on rotating scale 36 provides calibration allowing for precise settings of the carriage in increments of approximately 1/1000 of an inch. Consequently, rotating micro position adjustment knob 32 in partial rotations denoted by the thirty-two increments sets the position of carriage 14 to the desired location with a precision of approximately 1/1000 of an inch.

The preferred manner of use of the present invention will now be described. Initially, base 12 is mounted to mounting piece 16, which is then clamped or otherwise secured to the surface of the table of the workpiece forming equipment to be operated. The forming equipment is preferably woodworking cutting equipment such as a router table, but as can be readily appreciated, the present invention is not intended to be limited to woodworking equipment, and will be useful for any operation where precise positioning of an object with respect to a given reference point is desired.

Next, calibration and zeroing are performed. This is made easier by the adjustability of templates 44. In the zeroing process, fence 20 is pressed against the edge of the cutting equipment, such as a router blade, setting the zero point. Templates 44 are then slid in slots 43 until hairline cursor 47 reads at zero. Micro position adjustment knob 32 is preferably positioned in the middle of the range scale, and rotating scale 36 is rotated around micro position adjustment knob 32 until hairline cursor 78 reads at zero.

General positioning is then accomplished with the use of the scales or the programs on templates 44 to determine the position of the cut. General positioning has a resolution of 1/32 of an inch, though this could be varied by spacing the teeth on toothed racks 26 and 38 in increments other than 1/32 of an inch. In undertaking general positioning, carriage 14 is disengaged as shown in FIG. 4. The desired position is then located by referring to the templates 44, and carriage 14 is glided in the required direction until the selected scale or program line is directly under hairline cursor 47. If 1/32 of an inch incremental positioning is required, primary clamping lever 40 is asserted to the engaged position by raising it upward as shown in FIG. 6. Swing rack 30 is thereby locked in the engaged position. Carriage 14 is secured to base 12 and the cutting operation can be conducted.

If micro positioning is required between 1/32 of an inch increments, secondary clamping lever 42 is asserted downward after general positioning, as shown in FIG. 5. Micro positioning is then accomplished by rotating micro position adjustment knob 32 either forward or backward until the location of the cut is achieved with the desired precision. In so doing, either the position of the range scale is compared against the edge of the micro position adjustment knob or the calibrations on the rotating micro position adjustment knob are read under the hairline cursor of overlay plate 34.

After micro positioning is accomplished, primary clamping lever 40 is raised to the asserted position. Secondary clamping lever 42 is concurrently disengaged. Carriage 14 is very securely clamped to base 12 at this point, such that there is no free play and no axial rotation. This, in turn, provides a high degree of accuracy of the cut. Since the accuracy of positioning jig 10 is dependent upon clamping and zeroing the device for each project rather than upon the accuracy of roller bearings or other parts that could wear excessively and cause free play, the unity of base 12 and carriage 14 will not be compromised by wear. Also, as positioning jig 10 is preferably zeroed for each new project, 100% repeatability and accuracy is achieved for each project, even after long periods of use.

After the primary clamping lever has been asserted, the cut can be made. The process is then repeated until the project is completed.

Thus, from the above description, it can be seen that the present invention provides a smooth, lightweight, durable, and efficient positioning jig which requires no maintenance and which is self-lubricating. Additionally, the positioning jig of the present invention is easily and accurately micro positioned in intervals down to 1/1000 of an inch. The positioning jig of the present invention is easy to calibrate using the rotating scale and the sliding templates. Furthermore, locating the engaging mechanism to one side is a great improvement that allows the base to be of minimal size, thereby occupying a minimum of work space, while the carriage can be much longer than the base for use with larger workpieces. This is also facilitated by the light weight of the carriage. Due to the inventive clamping method, carriage 14 can be solidly clamped to base 12 with no axial movement, and each cut is 100% repeatable and rapidly accomplished even after long periods of use. Positioning is quickly and easily accomplished using the programmable multiple scales and templates, reducing the time and skill necessary to complete highly intricate projects.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A precision positioning jig for positioning a workpiece in a predetermined position relative to a given reference point, the positioning jig comprising:
  a. a base having means thereon for fixing the position of the base with respect to the given reference point;
  b. an elongated carriage supported by the base and being configured to move linearly relative to the base, the elongated carriage having two vertical opposing sides including an engagement side and a distal side, the elongated carriage being of a greater length than the base;
  c. means for coupling the elongated carriage to the base, the coupling means being movably connected to the base in order to be moved between an engaged position and a disengaged position, the coupling means being configured such that when the coupling means is in the disengaged position the elongated carriage can move linearly with respect to the base and substantially independently of the coupling means, the coupling means being configured to exert sufficient pressure against the engagement side of the elongated carriage when in the engaged position such that the elongated carriage is adequately secured to the base to at least prevent the elongated carriage from substantially moving linearly relative to the base;
  d. releasably securing means for securing the coupling means in the engaged position and for releasing the coupling means to the disengaged position, wherein the releasably securing means is movably connected to the base to move the coupling means between the engaged and disengaged positions:
  e. interlocking means for interlocking the coupling means together with the elongated carriage when pressure is exerted against the engagement side of the elongated carriage by the coupling means, the interlocking means being configured with predetermined incremental units for general positioning of the elongated carriage; and
  f. means disposed at one end of the elongated carriage for orienting the workpiece relative to the elongated carriage.

2. A positioning jig as recited in claim 1, wherein the workpiece orienting means comprises a fence adapted to receive the workpiece in a sliding relationship.

3. A positioning jig as recited in claim 1, further comprising at least one point of contact between the elongated carriage and the base, and wherein the elongated carriage is in sliding contact with the base at the at least one point of contact.

4. A positioning jig as recited in claim 3, further comprising planar surface means disposed at the at least one point of contact for providing low friction support and guidance between the elongated carriage and the base.

5. A positioning jig as recited in claim 4, wherein the planar surface low friction support and guidance means comprises a plurality of raised rails located on the elongated carriage and an elongated and substantially flat bearing plate mounted to the base at the at least one point of contact, a raised rail being in sliding communication with the bearing plate at each of the at least one points of contact.

6. A positioning jig as recited in claim 3, wherein the base is adapted to be fixed to a planar surface, wherein at least one point of contact occurs between planar surface means for providing low friction support and guidance between the elongated carriage and the base, wherein at least one planar surface means is located on the elongated carriage, wherein at least one planar surface means is located on the base, and wherein at least one planar surface means is situated at an angle to the planar surface.

7. A positioning jig as recited in claim 3, wherein at least one point of contact occurs between planar surface means for providing low friction support and guidance between the elongated carriage and on the base, wherein at least one planar surface means and guidance means is located on the distal side of the elongated carriage, wherein at least one planar surface support and guidance means is located on a distal side of the base adjacent to the distal side of the elongated carriage, and wherein the planar surface means on the distal side of the elongated carriage and the planar surface means on the distal side of the base are configured to enable the elongated carriage to be braced against the base when the releasably securing means is an engaged positioned.

8. A positioning jig as recited in claim 5, wherein the bearing plate is self lubricated.

9. A positioning jig as recited in claim 8, wherein the self lubrication is provided by wax impregnated into the bearing plate.

10. A positioning jig as recited in claim 5, wherein the bearing plate is made of polyethylene.

11. A positioning jig as recited in claim 1, wherein the base has a proximal and a distal side and is adapted to be fixed to a planar surface, and further comprising:
  a. a plurality of points of contact between the elongated carriage and the base, and wherein the elongated carriage is in sliding communication with the base at each of points of contact;
  b. a bearing plate on each bearing surface located on the distal side of the base at each of the points of contact between the elongated carriage and the base for reducing friction between the base and the elongated carriage, at least two of the bearing surfaces being located at a 45 degree angle to the planar surface; and
  c. a raised ridge on the distal side of the elongated carriage in sliding communication with the bearing plate at each of the points of contact.

12. A positioning jig as recited in claim 1, wherein the elongated carriage comprises aluminum.

13. A positioning jig as recited in claim 12, wherein the carriage is is substantially hollow.

14. A positioning jig as recited in claim 1, wherein the coupling means is pivotally connected to the base and wherein the releasably securing means is pivotally connected to the base.

15. A positioning jig as recited in claim 1, wherein the releasably securing means is movably connected to the base by a side fixture that is connected to the base and wherein the releasably securing means is pivotally connected to the side fixture.

16. A positioning jig as recited in claim 1, wherein at least a substantial portion of the coupling means is located on a portion of the base situated by the engagement side of the elongated carriage.

17. A positioning jig as recited in claim 1, wherein the coupling means comprises a retractable swing rack pivotally connected to the base, wherein the interlocking means comprises a first interlocking element on the retractable swing rack and a second interlocking element on the engagement side of the elongated carriage opposite said first interlocking element, and wherein a pivoting the retractable swing rack toward the engagement side of the elongated carriage enables the first interlocking element to interlock with the second interlocking element.

18. A positioning jig as recited in claim 17, wherein the elongated carriage can move substantially independently of the coupling means as the retractable swing rack is spring biased away from the elongated carriage by at least one spring connected to the retractable swing rack and the base.

19. A positioning jig as recited in claim 17, wherein the releasably securing means comprises a primary clamping lever pivotably connected to the base, the retractable swing rack being locatable in the engaged and disengaged positions by pivoting the primary clamping lever.

20. A positioning jig as recited in claim 17, wherein the first interlocking element and the second interlocking element each comprise complementary toothed racks, the toothed racks being disengaged when the swing rack is in the disengaged position thereby allowing the elongated carriage to slide freely and being engaged when the swing rack is in the engaged position thereby meshing together the elongated carriage to the swing rack.

21. A positioning jig as recited in claim 19, wherein the releasably securing means further comprises a clamping surface on the clamping lever and wherein the coupling means further comprises an engaging pad on the retractable swing rack, the clamping surface and engaging pad being configured such that pivoting the primary clamping lever enables the clamping surface to generate pressure on the engaging pad which translates to pressure between the elongated carriage and the base, the clamping surface and engaging pad also being configured to enable the primary clamping lever to maintain the retractable swing rack in an engaged position until manual pressure is applied to pivot the retractable swing rack.

22. A positioning jig as recited in claim 1, further comprising means cooperating with the coupling means for finitely adjusting the position of the elongated carriage relative to the base in increments finer than is enabled by the predetermined incremental units on the interlocking means.

23. A positioning jig as recited in claim 22, wherein the finite position adjusting means comprises a secondary clamping lever that is pivotally connected to the base for releasably securing the elongated carriage in a position engaging the base.

24. A positioning jig as recited in claim 1, wherein the coupling means comprises a retractable swing rack pivotally connected to a side fixture that is connected to the base and wherein the releasable securing means comprises a primary clamping lever pivotably connected to the side fixture, the swing rack being locatable in the engaged and disengaged positions by pivoting the primary clamping lever, wherein the jig further comprises a secondary clamping lever that is pivotally connected to the base and that can be pivoted to an asserted position and an unasserted position against the swing rack, and wherein the jig further comprises finite position adjusting means for finitely adjusting the position of the elongated carriage relative to the base.

25. A positioning jig as recited in claim 24, wherein the primary clamping lever asserts more pressure when in the engaged position than the secondary clamping lever asserts when in the asserted position.

26. A positioning jig as recited in claim 24, wherein the asserted position of the secondary clamping lever prohibits rotational movement of the swing rack while concurrently asserting sufficient pressure against the engagement side of the elongated carriage to couple the carriage to the base and yet still permitting the elongated carriage to move linearly relative to the base for micro positioning of the carriage.

27. A positioning jig as recited in claim 24, wherein the finite position adjusting means further comprises a positioning screw rotatably mounted within the side fixture and having a proximal end in communication with a rounded hinge core portion of the swing rack, the positioning screw causing the hinge core portion to move within a hinge groove when the positioning screw is rotated within the fixture, and further comprising a compression spring that provides a back pressure against the positioning screw.

28. A positioning jig as recited in claim 27, further comprising a micro position adjustment knob attached to a distal end of the positioning screw for rotating the positioning screw in finite increments to effect micro positioning of the elongated carriage.

29. A positioning jig as recited in claim 1,
wherein the coupling means comprises a swing rack mounted by a hinge to a side fixture in one side of the base, and being capable of being linearly positionable in increments finer than 1/32 of an inch in a longitudinal direction;
the jig further comprising a positioning screw threaded through the side fixture, the positioning screw having a proximal end and a distal end, the proximal end in communication with a first side of the swing rack for causing movement of the swing rack in the longitudinal direction;
the jig further comprising a compression spring communicating with a second side of the swing rack hinge axis to provide a back pressure against the linear movement of the swing rack;
the jig further comprising a micro position adjustment knob attached to the distal end of the positioning screw;
the jig further comprising a secondary clamping lever pivotally connected to the side fixture and being configured to be asserted against the swing rack to cause the swing rack to assert pressure against the engagement side of the elongated carriage to couple the carriage to the base, while concurrently allowing the swing rack to move linearly relative to the base; and
wherein the releasably coupling means comprises a primary clamping lever with greater clamping pressure than the secondary clamping lever for securing the hinged swing rack against the elongated carriage, thereby clamping the elongated carriage to the base and prohibiting any movement of the elongated carriage relative to the base.

30. A positioning jig as recited in claim 22, further comprising means for precisely determining the position of the elongated carriage with respect to the base while finitely adjusting the position of the elongated carriage relative to the base, wherein the position determining means is mounted to the base.

31. A positioning jig as recited in claim 30, wherein the position determining means comprises a micro position adjustment knob and an overlay plate above the micro position adjustment knob, the overlay plate being provided with a range scale marked in predetermined incremental units, the range scale being readable against one edge of the micro position adjustment knob.

32. A positioning jig as recited in claim 31, further comprising a rotating scale marked in predetermined incremental units and fastened around the micro position adjustment knob, and wherein the overlay plate has a hairline cursor for reading the rotating scale.

33. A positioning jig as recited in claim 22, further comprising:
a. a micro position adjustment knob attached to a positioning screw rotatably mounted to the base;
b. a rotating scale circumscribing the micro position adjustment knob and having designated thereon predetermined units in increments finer than 1/32 of an inch; and
c. a transparent overlay plate disposed above the micro position adjustment knob, the overlay plate having a range scale marked with predetermined incremental units for reading against an edge of the micro position adjustment knob, and also having a hairline cursor for reading the rotating scale.

34. A precision positioning jig for positioning a workpiece in a predetermined position relative to a given reference point, the positioning jig comprising:
j. a base capable of being attached to a planar surface to fix the position of the base relative to the given reference point;
k. an elongated carriage, the carriage being mounted on the base and being made of hollow aluminum, the carriage being divided by at least one interior wall extending for substantially the length of the carriage, the at least one wall forming a plurality of hollows;
l. a fence disposed at one end of the carriage for orienting the workpiece relative to the carriage;
m. a plurality of points of contact between the carriage and the base, the elongated member being in sliding contact with the base at the points of contact;
n. a bearing plate disposed on the base at each of the points of contact for providing low friction support and guidance between the carriage and the base, at least two of the bearing plates being located on a distal side of the base at a 45 degree angle to the planar surface to form a brace, the bearing plates being constructed of wax-impregnated polyethylene;
o. a plurality of raised rails located on the carriage, a raised rail being in sliding contact with the bearing plate at each of the points of contact;
p. a retractable swing rack having a first position and a second position and being pivotally mounted by a hinge to a fixture incorporated into a proximal side of the base, the swing rack having disposed thereon a toothed rack for engaging a corresponding toothed rack located on the elongated member when the swing rack is in the second position, the swing rack being spring-loaded to automatically retract to the first position when not clamped in the second position, the swing rack being linearly positionable in a longitudinal direction in increments finer than 1/32 of an inch;
q. a positioning screw having proximal and distal ends and being threaded through the fixture, the proximal end being in communication with a first end of the swing rack for moving the swing rack in a longitudinal direction when the positioning screw is rotated;
r. a compression spring on a second end of the swing rack for providing back pressure against the swing rack;
s. a micro position adjustment knob attached to the distal end of the positioning screw for rotating the positioning screw in finite increments;

t. a secondary clamping lever for prohibiting the swing rack from rotating when in the second position, while concurrently allowing the swing rack to move in the longitudinal direction along its hinge axis, thereby moving the carriage in finite, predetermined increments;

u. a primary clamping lever with greater clamping pressure than the secondary clamping lever for securing the hinged swing rack to the carriage when in the second position, thereby clamping the carriage against the brace on the distal side of the base and prohibiting movement of the carriage relative to the base;

v. a rotating scale circumscribing the micro position adjustment knob and having designated thereon predetermined increments finer than 1/32 of an inch; and w. a transparent overlay plate disposed above the micro position adjustment knob, the overlay plate having a range scale marked with predetermined incremental units on its surface for reading against an edge of the micro position adjustment knob and also having a hairline cursor for reading the rotating scale.

35. A precision positioning jig for positioning a workpiece in a predetermined position relative to a given reference point, the positioning jig comprising:

a base having means thereon for fixing the position of the base with respect to the given reference point;

an elongated carriage supported by the base and being configured to move linearly relative to the base, said elongated carriage being of a greater length than the base;

a retractable swing rack pivotably connected to a side fixture, said side fixture being connected to the base and being situated to one side of the elongated carriage, said retractable swing rack being pivotable by a clamping lever to an engaged position such that pressure is exerted by the retractable swing rack against the elongated carriage to at least prevent the elongated carriage from substantially moving linearly relative to the base, said retractable swing rack being pivotable by the clamping lever to a disengaged position away from the elongated carriage such that the elongated carriage can move linearly with respect to the base and substantially independently of the retractable swing rack, said clamping lever being pivotably connected to the side fixture;

interlocking means for interlocking the retractable swing rack together with the elongated carriage when the retractable swing rack is pivoted by the clamping lever to the engaged position, the interlocking means being configured with predetermined incremental units for general positioning of elongated carriage; and means disposed at one end of the elongated carriage for orienting the workpiece relative to the elongated carriage.

36. A positioning jig as recited in claim 35, wherein the elongated carriage has opposing vertical sides including an engagement side and a distal side, and wherein the retractable swing rack engages the engagement side when in the engaged position.

37. A positioning jig as recited in claim 35, further comprising at least one point of contact between the elongated carriage and the base, and wherein the elongated carriage is in sliding contact with the base at the at least one point of contact.

38. A positioning jig as recited in claim 37, further comprising planar surface means disposed at the at least one point of contact for providing low friction support and guidance between the elongated carriage and the base.

39. A positioning jig as recited in claim 36, wherein the interlocking means comprises a first interlocking element on the retractable swing rack and a second interlocking element on the engagement side of the elongated carriage opposite said first interlocking element, and wherein pivoting the retractable swing rack toward the engagement side of the elongated carriage enables the first interlocking element to interlock with the second interlocking element.

40. A positioning jig as recited in claim 35, wherein the elongated carriage can move substantially independently of the swing rack as the retractable swing rack is spring biased away from the elongated carriage by at least one spring connected to the retractable swing rack and the base.

41. A positioning jig as recited in claim 35, wherein the first interlocking element and the second interlocking element each comprise complementary toothed racks, the toothed racks being disengaged when the swing rack is in the disengaged position thereby allowing the elongated carriage to slide freely and being engaged when the swing rack is in the engaged position thereby meshing together and fastening the elongated carriage to the swing rack.

42. A positioning jig as recited in claim 35, wherein the clamping lever is a primary clamping lever that further comprises a clamping surface on the primary clamping lever and wherein the retractable swing rack further comprises an engaging pad on the retractable swing rack, the clamping surface and engaging pad being configured such that pivoting the primary clamping lever enables the clamping surface to generate pressure on the engaging pad which translates to pressure between the elongated carriage and the base, the clamping surface and engaging pad also being configured to enable the primary clamping lever to maintain the retractable swing rack in an engaged position until manual pressure is applied to pivot the retractable swing rack.

43. A positioning jig as recited in claim 35, further comprising means cooperating with the retractable swing rack for finitely adjusting the position of the elongated carriage relative to the base in increments finer than is enabled by the predetermined incremental units on the interlocking means.

44. A positioning jig as recited in claim 43, wherein the finite position adjusting means comprises a secondary clamping lever that is pivotally connected to the base for releasably securing the elongated carriage in a position engaging the base.

45. A positioning jig as recited in claim 35, wherein the jig further comprises a secondary clamping lever that is pivotally connected to the base and that can be pivoted to an asserted position and an unasserted position against the swing rack, and wherein the jig further comprises finite position adjusting means for finitely adjusting the position of the elongated carriage relative to the base.

46. A positioning jig as recited in claim 45, wherein the primary clamping lever asserts more pressure when in the engaged position than the secondary clamping lever asserts when in the asserted position.

47. A positioning jig as recited in claim 45, wherein the asserted position of the secondary clamping lever prohibits rotational movement of the swing rack while concurrently asserting sufficient pressure against the elongated carriage to couple the carriage to the base and yet still permitting the elongated carriage to move linearly relative to the base for micro positioning of the carriage.

48. A positioning jig as recited in claim 45, wherein the finite position adjusting means further comprises a positioning screw rotatably mounted within the side fixture and having a proximal end in communication with a rounded hinge core portion of the swing rack, the positioning screw causing the hinge core portion to move within a hinge groove when the positioning screw is rotated within the fixture, and further comprising a compression spring that provides a back pressure against the positioning screw.

49. A positioning jig as recited in claim 48, further comprising a micro position adjustment knob attached to a distal end of the positioning screw for rotating the positioning screw in finite increments to effect micro positioning of the elongated carriage.

50. A positioning jig as recited in claim 43, further comprising means for precisely determining the position of the elongated carriage with respect to the base while finitely adjusting the position of the elongated carriage relative to the base, wherein the position determining means is mounted to the base.

51. A precision positioning jig for positioning a workpiece in a predetermined position relative to a given reference point, the positioning jig comprising:

a base having means thereon for fixing the position of the base with respect to the given reference point;

an elongated carriage supported by the base and being configured to move linearly relative to the base, the elongated carriage having two vertical opposing sides including an engagement side and a distal side, the elongated carriage being of a greater length than the base;

a retractable swing rack pivotably connected to the base and that is pivotable between an engaged position and a disengaged position, the retractable swing rack being configured such that when the retractable swing rack is in the engaged position pressure is exerted against the engagement side of the elongated carriage that is sufficient to adequately couple to the elongated carriage to the base to at least prevent the elongated carriage from substantially moving linearly relative to the base, the retractable swing rack being configured such that when the retractable swing rack is in the disengaged position the elongated carriage can move linearly with respect to the base and substantially independently of the retractable swing rack a clamping lever pivotably connected to the base and configured for pivoting the retractable swing rack between the engaged and disengaged positions;

interlocking means for interlocking the retractable swing rack together with the elongated carriage when pressure is exerted against the engagement side of the elongated carriage by the retractable swing rack, the interlocking means being configured with predetermined incremental units for general positioning of the elongated carriage; and means disposed at one end of the elongated carriage for orienting the workpiece relative to the elongated carriage.

* * * * *

UNITED STATES PATENT AND TRADEMARK OFFICE
CERTIFICATE OF CORRECTION

PATENT NO. : 5,716,045

DATED : Feb. 10, 1998

INVENTOR(S) : Christopher L. Taylor

It is certified that error appears in the above-identified patent and that said Letters Patent is hereby corrected as shown below:

Cover Page, References Cited, please add the following U.S. Patent Documents:

| | | |
|---|---|---|
| 2,265,335 | 12/1941 | Aumann |
| 2,806,493 | 9/1957 | Gaskell |
| 4,600,184 | 7/1986 | Ashworth |
| 4,993,167 | 2/1991 | Durfee, Jr. |
| 5,299,609 | 4/1994 | Wedler |
| 5,388,343 | 2/1995 | Garau et al. |
| 5,553,644 | 9/1996 | Adams |

Cover Page, Foreign Patent Documents, change "776207" to --776,207--

Col. 1, line 35, after "to" delete --be--

Col. 1, line 41, after "the" change "curing" to --cutting--

Col. 5, line 11, before "a" insert --to--

Col. 8, line 42, after "surface" change "16" to --66--

Col. 9, line 13, after "rack" change "62" to --30--

Col. 9, line 41, before "base" insert --and--

Col. 9, line 42, after "position" delete --and--

Col. 10, line 22, after "five" delete --of--

UNITED STATES PATENT AND TRADEMARK OFFICE
CERTIFICATE OF CORRECTION

PATENT NO. : 5,716,045
DATED : Feb. 10, 1998
INVENTOR(S) : Christopher L. Taylor It is certified that error appears in the above-identified patent and that said Letters Patent is hereby corrected as shown below:

Col. 10, line 23, after "of" insert --the--

Col. 11, line 31, after "of" insert --second--

Col. 13, line 25, after "is" insert --in--

Col. 13, line 41, after "of" (1st. occurrence) insert --the--.

Col. 13, line 54, after "carriage" delete the first occurance of --is--

Col. 14, line 7, after "wherein" delete --a--

Col. 16, line 23, before "a base" change "j." to --a.--

Col. 16, line 26, before "an" change "k." to --b.--

Col. 16, line 31, before "a fence" change "l." to --c.--

Col. 16, line 33, before "a plurality" change "m." to --d.--

Col. 16, line 36, before "a bearing" change "n." to --e.--

Col. 16, line 43, before "a plurality" change "o." to --f.--

Col. 16, line 46, before "a retractable" change "p." to --g.--

Col. 16, line 57, before "a positioning" change "q." to --h.--

UNITED STATES PATENT AND TRADEMARK OFFICE
CERTIFICATE OF CORRECTION

PATENT NO. : 5,716,045
DATED : Feb. 10, 1998
INVENTOR(S) : Christopher L. Taylor It is certified that error appears in the above-identified patent and that said Letters Patent is hereby corrected as shown below:

Col. 16, line 62, before "a compression" change "r." to --i.--

Col. 16, line 64, before "a micro" change "s." to --j.--

Col. 17, line 1, before "a secondary" change "t." to --k.--

Col. 17, line 7, before "a primary" change "u." to --l.--

Col. 17, line 13, before "a rotating" change "v." to --m.--

Col. 17, line 16, before "a transparent" change "w." to --n.--

Signed and Sealed this

Twenty-ninth Day of December, 1998

Attest:

BRUCE LEHMAN

Attesting Officer     Commissioner of Patents and Trademarks